United States Patent
Pahlavan et al.

(10) Patent No.: US 8,712,323 B2
(45) Date of Patent: Apr. 29, 2014

(54) INDUCTIVE ANTENNA COUPLING

(75) Inventors: Kourosh Pahlavan, Palo Alto, CA (US); Mohammad Amin Arbabian, San Francisco, CA (US)

(73) Assignee: Tagarray, Inc., Palo Alto, CA (US)

( * ) Notice: Subject to any disclaimer, the term of this patent is extended or adjusted under 35 U.S.C. 154(b) by 1313 days.

(21) Appl. No.: 12/148,497

(22) Filed: Apr. 21, 2008

(65) Prior Publication Data

US 2009/0264067 A1 Oct. 22, 2009

(51) Int. Cl.
*H04B 7/00* (2006.01)

(52) U.S. Cl.
USPC ............................. 455/41.1; 340/572.7

(58) Field of Classification Search
USPC ......... 455/41.1, 41.2, 39, 333, 334; 340/10.1, 340/10.51, 10.5, 5.6, 5.8, 572.7
See application file for complete search history.

(56) References Cited

U.S. PATENT DOCUMENTS

| | | | | |
|---|---|---|---|---|
| 4,953,123 | A * | 8/1990 | Takeuchi et al. | 365/66 |
| 7,333,786 | B2 * | 2/2008 | Kikuchi et al. | 455/130 |
| 7,391,596 | B2 * | 6/2008 | Khorram | 361/58 |
| 7,541,930 | B2 * | 6/2009 | Saarisalo et al. | 340/572.7 |
| 7,821,401 | B2 * | 10/2010 | Martin et al. | 340/572.5 |
| 7,831,205 | B2 * | 11/2010 | Jack et al. | 455/40 |
| 2006/0012482 | A1 * | 1/2006 | Zalud et al. | 340/572.7 |

* cited by examiner

*Primary Examiner* — Sonny Trinh
(74) *Attorney, Agent, or Firm* — TIPS Group (57) ABSTRACT

This invention pertains to the connection between a radio frequency circuit and its antenna. Miniaturization of radio frequency integrated circuits has made attaching these circuits to their antennas increasingly difficult and costly. This invention uses magnetic coupling, as performed in transformers, between circuits and antennas as a practical solution to reduce cost and effort in attaching the two sides as well as to protect the circuit against electrostatic discharge. Furthermore a simple pre-assembly testing methodology is accounted for as an additional benefit of the method.

4 Claims, 7 Drawing Sheets

Figure 7

INDUCTIVE ANTENNA COUPLING

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates generally to communication between physical objects, communication and radio systems, radio frequency for item and inventory identification, tracking and management; and more particularly to methods and means of connecting radio circuits and devices to external radiation elements so as to propagate their radio waves.

As the limits of miniaturization in electronic devices are yet to be discovered, the sizes of some other elements in electronics remain constrained by the rules of physics and cannot match the miniaturization exhibited in ICs (Integrated Circuits). A good example of this mismatch in miniaturization is in Radio Frequency Identification (RFID) tags where the whole electric circuit including the memory, controller, radio frequency links, etc. can be implemented in a miniaturized IC, the size of a grain of salt. However, the radiation elements (antennas) needed to radiate the information to the outside world remain relatively large. This mismatch in miniaturization means that extremely small IC pads are to be connected to relatively much larger antennas. That is, the assembly accuracy is dictated by the IC pad geometry which in turn results in the requirement for high placement accuracy and subsequently high cost of assembly.

An important source of performance degradation in small signal CMOS (Complementary Metal Oxide Semiconductor) ICs is their need for protection against ESD (Electrostatic Discharge). The circuitry needed for ESD protection has an undesirable performance impact on an ultra low power radio and in particular on the power recovery frontend of a RFID chip. This is also true for many high data rate ICs for wireless standards to the extent that in some cases ESD is eliminated altogether from critical signals rendering the system vulnerable to discharge effects. Using an indirect non-conductive connection such as the coupling mechanism suggested by this invention, between the antenna and the chip mitigates the need for ESD protection.

Furthermore, many popular conductive materials used to connect ICs to antennas exhibit varying performance in different circumstances, such as changes in humidity. Coupling media (often bond-wires) tend to result in non-predictable or performance degrading characteristics especially for high frequency applications where the inductance of the coupler becomes an important factor. The coupling mechanism suggested by this invention makes the coupling performance insensitive to any such changes.

Normally, it is very difficult to massively probe and test whole wafers while individual dice are still on them. Such a procedure, if possible, would yield significant speed and economic advantages in the testing process. One major motivation for this invention is to enable on-wafer testing of the dice directly before attaching to any external substrates.

BRIEF SUMMARY OF THE INVENTION

We introduce a new method and apparatus to couple electromagnetic energy from antennas to IC chips for RFID (Radio Frequency Identification), NFC (Near Field Communication) and similar radio communication technologies where antenna-chip connection is crucial in terms of cost, ease of assembly, signal quality and in general, electrical, environmental and mechanical constraints.

When a circuit, typically a Silicon chip, is to be connected to one or multiple antennas, the connection mechanism plays an important role. The chip pads are typically very small in size; attaching such pads to external antennas or intermediary antenna interfaces imposes a high degree of accuracy and precision on the attach process. This invention makes it possible to couple a radio chip to external antennas or antenna frontends with low requirements on precision and accuracy and thereby cost.

The antenna can be embedded in a two or three dimensional substrate, such as paper, polymer film, plastic parts, PCB (Printed Circuit board), LTCC (Low Temperature Cofired Ceramic) or any other accommodating materials, configurations and technologies. This antenna carrier, hereafter, will be called "the antenna substrate" or in short "the substrate".

Although this invention is initially simulated, implemented and tested for an UHF RFID system, the idea could be used for any frequency band and any radio standard not limited to RFID systems.

The only limitations arise from the size of the transformer on the substrate setting the minimum diameter and also the self-resonance frequency (SRF) of the structure that arises as a result of inter-winding as well as parasitic capacitances. The winding wire width and the spacing between the two sides of the transformer are designed for maximizing the SRF as well as power efficiency.

This invention comprises using inductive coupling to convey electrical signals and energy from a circuit on one substrate (typically a chip) to an antenna on another substrate, as performed in electric transformers. The primary side of the transformer is located on the circuit carrier (normally, but not necessarily a Silicon chip) and the secondary side on the antenna substrate, an intermediary circuit or any other circuit emulating an antenna such as a test interface. The turn ratio and the size of the transformer are optimized for maximum power transfer as well as acceptable impedance load for either side.

Figure 1A:
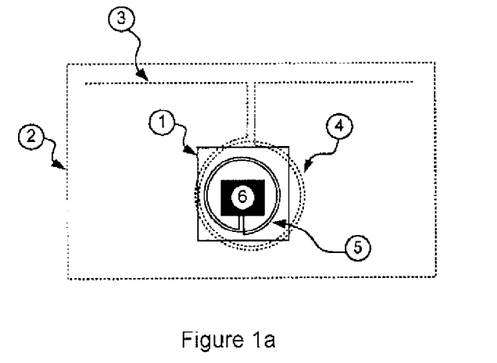
FIG. 1a is a plan view of an example RFID tag configured for inductive coupling of RFID signals between a radio frequency circuit and an RFID antenna.
Figure 1B:
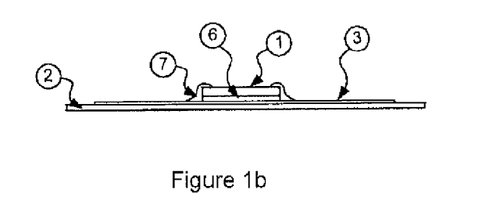
Figure 2A:
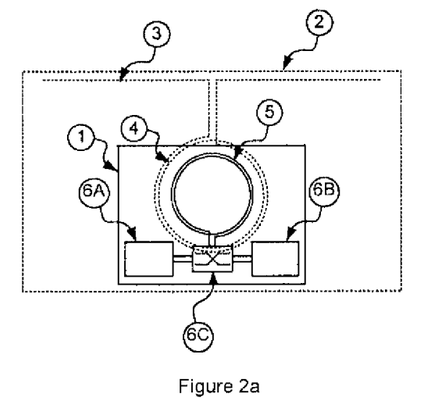
FIG. 2a is a plan view of an RFID tag having two or more radio frequency circuits coupling through a switch to a common coil on the antenna substrate to inductively couple to a single coil on the antenna substrate.
Figure 2B:
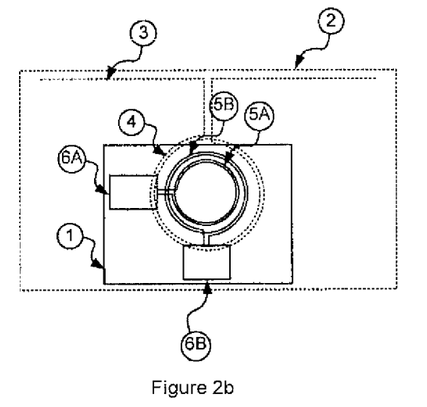
FIG. 2b is a plan view of an RFID tag having two radio frequency circuits inductively coupling through concentric respective coils on the circuit substrate to a single coil on the antenna substrate.
Figure 2C:
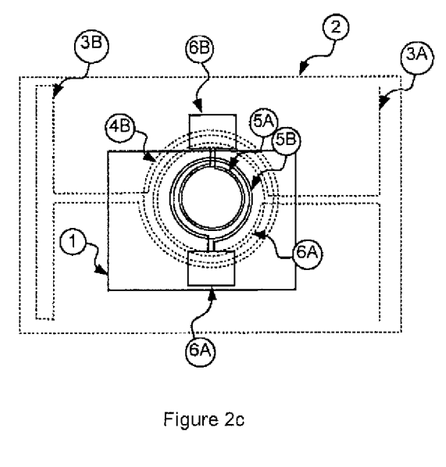
FIG. 2c is a plan view of an RFID tag having two radio frequency circuits inductively coupling through respective concentric coils to a pair of corresponding coils on the antenna substrate.
Figure 2D:
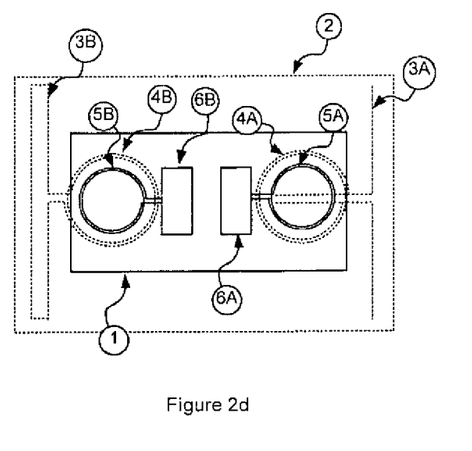
FIG. 2d is a plan view of an RFID tag having two radio frequency circuits inductively coupling through respective non-concentric coils to a pair of corresponding coils on the antenna substrate.

FIG. 1 illustrates a chip (1) containing a radio frequency circuit (6) connected to an on-chip inductor (5). This chip is put on a substrate (2) that carries an antenna (3) connected to an inductor (4). The chip is isolated from the substrate by (7) to avoid a short circuit. The thickness and the material for this isolation can be chosen to yield the optimal performance given the mechanical, electrical and environmental requirements on the tag assembly.

It is an objective of this invention to reduce assembly costs involved in attaching a radio frequency chip to its radiating elements. By eliminating the elements and work moments involved in bonding the chip to the antenna substrate (wire bonding, flip-chip technology, conductive adhesion, etc), the invention reduces the cost of fabrication and testing significantly. The placement of the chip on the antenna substrate requires much less accuracy and as there is no metallic contact, the need for ESD protection is greatly mitigated.

Reduced required accuracy for chip placement is a consequence of the greater flexibility made available in antenna impedance design and the beneficial transformer properties. A small relative misalignment of the transformer sides causes the coupling factor to change. However, resonances on either side of the transformer as a function of changes in the imaginary part, and circuit functionality as a function of the real part, prove to be insensitive to relatively small changes in the coupling factor.

It is another objective of this invention to reduce the complexity and cost of the testing procedure for the chips by enabling contact-free probing of the chips. A probe that is equipped with the secondary side of the transformer can approach the chip, even when it is on the wafer, energize it and validate its functionality on the antenna output.

Figure 3:
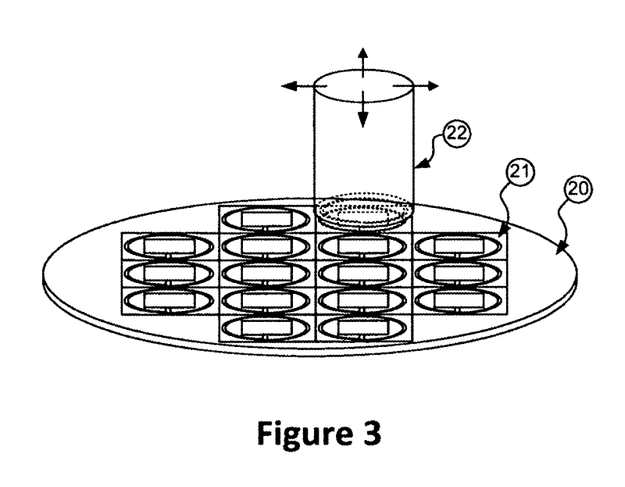
FIG. 3 shows a plurality of radio frequency circuits arrayed on a circuit substrate being probed through inductive coupling.

FIG. 3 shows an embodiment for this testing approach. In this embodiment, the testing head (22) can travel and position itself above any die (21) on the wafer (20), power it up and communicate with it as if the head were an antenna. Multiple heads can probe multiple dice simultaneously as well so as to accelerate the testing process.

It is yet another objective of this invention to alleviate the need for ESD protection of the chip by deploying inductive coupling as the means of electric connection between the chip and the external substrate.

ESD protection, testing and chip bonding account for a significant portion of the total RFID tag cost. Many other similar systems (including but not limited to chips in Wireless Local Area Network (LAN), Personal Area Network (PAN) and sensor network) can also greatly benefit from this invention so as to reduce fabrication and testing costs.

It is yet another objective of this invention to enable multiple antenna connection to the same chip by means of multiple concentric inductors on the chip or a single switched inductor on the chip or a combination of both of these arrangements. FIG. 3 depicts another embodiment where multiple concentric inductors on the die couple to a single or multiple inductors on the antenna substrate. This is the case when multiple antenna connections are needed for the die. When a single antenna on the substrate can feed two different circuits that may even use the same antenna at different frequencies, a single antenna could couple to both on-chip inductors. Another solution is when on on-chip inductor is switched to different outputs on the chip sequentially; this is particularly true in the case of time-domain based systems.

FIG. 2 shows four cases where antenna and coupling inductors are implemented to accommodate communication with two different RF circuits. It is trivial to extrapolate these cases to more complex embodiments where more than two circuits, bands, antennas, etc. are served by the subject of this invention.

In FIG. 2 top left, inside the chip (1) two different circuits (6A) and (6B) connect to the on-chip inductor (5) through the switching circuit (6C). The switch (6C) can connect (6A) and/or (6B) to (5) and thereby cause inductive coupling to inductor (4) located on the antenna substrate (2). The antenna (3) will then propagate the electromagnetic energy provided to it.

In FIG. 2 top right, a similar situation is present. The difference here is that in this embodiment, the circuits (6A) and (6B) use their own inductors (5A) and (5B) to couple to a common antenna (3) through inductor (4) on the antenna substrate (2). It is worthwhile to mention that (5A) and (5B) do not need to be concentric, but such an arrangement is topologically convenient.

FIG. 2 bottom left is the most straight forward case where two antennas (3A) and (3B) couple to two circuits (6A) and (6B) through coupling of (5A) and (5B) to (4A) and (4B) respectively. FIG. 2 bottom right shows the same for the non-concentric case.

Needless to say, many other combinations involving multiple primary sides and secondary sides can be implemented as well. The mentioned three embodiments are examples of how such combinations could look like.

The methods and the techniques associated with it are generally applicable in power and data communication between antennas and RFID chips as well as in data transfer in other RF or other systems. In addition, due to the relatively large bandwidth of transformer systems, this invention allows for high bandwidth data transfer where applicable.

Accurate inductor wire layout on chip as well as on the antenna substrate will allow for accurate prediction of bandwidth, efficiency and performance, assigning the bulk of the performance deviation budget to placement inaccuracies.

The merits of this invention has been verified in lab tests as well as in full 3D electromagnetic simulations that fully captured the effect of chip placement on the antenna performance, coupling efficiency and impedance transfers. Finally, an RFID product solution with antenna coupling for two different frequencies and bandwidths was implemented in 0.13 u CMOS. The chip uses two sets of transformers to couple to UHF and UWB (Ultra-Wide Band) antennas, demonstrating a great potential and promise for both narrow-band and wideband systems.

BRIEF DESCRIPTION OF THE DRAWINGS

FIG. 1b is a cross-sectional view of the RFID tag of FIG. 1a;

DETAILED DESCRIPTION OF THE INVENTION

The invention consists of a transformer with the primary winding on the circuit substrate and the secondary winding on the antenna substrate. The primary side on the chip can use a single turn or multiple turns. It can be implemented in a single planar layer or in multiple layers on any available metal/conductive layers in the process technology. Multiple turns on multiple layers can be used to enhance the inductance. Any combination of the mentioned methods on both sides is possible. The planar inductor could take the form of a polygon spiral shape with multiple sides (including but not limited to 4, 6 and 8 sides) or a circular shape as provided and constrained by the foundry process.

The diameter size, number of turns, and the width of each turn (no uniform width/thickness of conductor across different turns and/or layers is assumed) are to be optimized for the required frequency and bandwidth in terms of efficiency and impedance transfer. Depending on the substrate fabrication issues, the same design options could be applied to the secondary side of the transformer.

The primary side of the transformer is connected to the RF-system frontend. In the case of an RFID system, this frontend is typically the input stage of the initial charge pump or other variants of a power recovery system. The secondary side is connected to the antenna. The transformer in essence couples the antenna to the chip through magnetic coupling. The antenna then radiates the power in the transmit mode, or absorbs power in the receiving mode, based on electromagnetic principles. By exercising proper care in designing the position and alignment of transformers, a multitude of on-chip transformers can be arranged to couple various signals to a multitude of on-substrate antennas.

Figure 4:
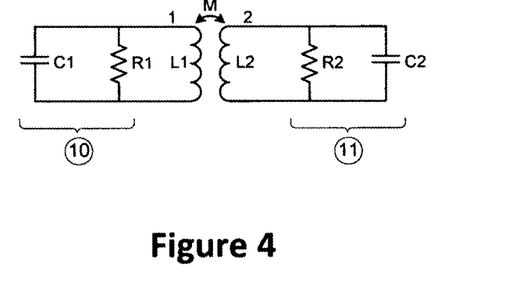
FIG. 4 is a schematic diagram of a model transformer.

FIG. 4 shows the principal circuit diagram describing the coupling mechanism and a simplified model in case of a RFID chip coupling with its antenna substrate. The equivalent circuit for RFID chip frontend is labeled by (10) and the equivalent circuit for the antenna is denoted by (11).

Figure 5:
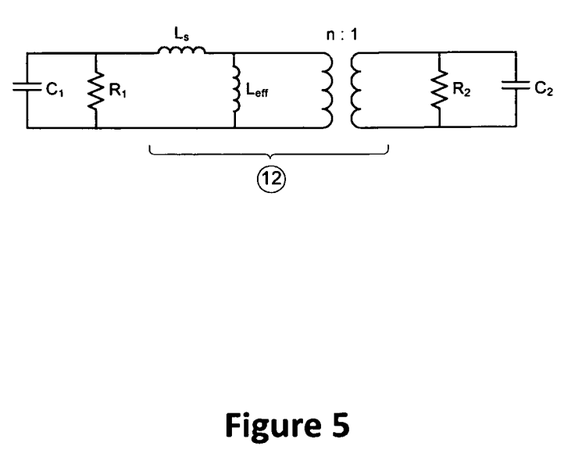
FIG. 5 is a modification of the schematic diagram of FIG. 4 to include a transformer equivalent model.

Inaccurate positioning of the die on the antenna substrate causes the primary side, inductor (5) in FIG. 1, to be dislocated with respect to the optimal coupling position on top of the secondary side, inductor (4). This dislocation causes changes in the coupling efficiency of the transformer denoted by the coupling factor K. The maximum value for K is 1. In FIG. 5, the transformer equivalent model (12)
is added to the model. The model is expanded to include the series and parallel inductors $L_s$ and $L_{eff}$ so as to study the impact of variations in the coupling factor K on the behavior of the coupling. For this equivalent circuit, $L_s=(1-K^2)L_1$ and $L_{eff}=K^2L_1$. The coupling is determined by both K and the transformer inductances $L_1$ and $L_2$ on the primary and secondary sides respectively. That is, the transformer ratio n:1 can be written as $(K\sqrt{L_1/L_2}):1$.

Figure 6:
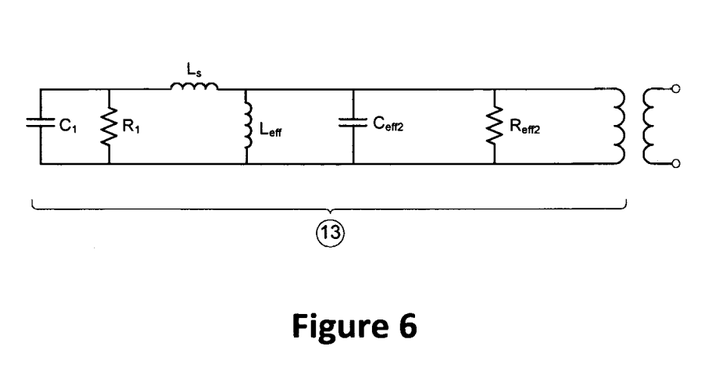
FIG. 6 is a modification of the schematic diagram of FIG. 5 to include the resistive load and capacitive load of the antenna as seen by the primary side of the transformer.

The model in FIG. 6, the equivalent circuit for primary side (13), is completed by adding the resistive ($R_{eff2}$) and the capacitive ($C_{eff2}$) load of the antenna on the secondary side as seen by the primary side. Needless to say, the assumption here is that the antenna is as in most RFID tags capacitive, which is not necessarily and always the case; the model will need to adjust to the antenna parameters on the secondary side in other cases. In the model we have set up, the resonance frequency of $L_{eff}$ and $C_{eff2}$ is:

$$\frac{1}{\sqrt{K^2L_1\frac{C_2}{K^2}\frac{L_2}{L_1}}} = \frac{1}{\sqrt{C_2L_2}}$$

That is, the resonance frequency is not a function of K. In other words, the inaccuracy in the relative placement of the two coupling inductors does not impact the dominant resonance frequency on the primary side. The resistance $R_{eff2}$ (real part), however, is a function of K:

$$R_{eff2} = R_2K^2\frac{L_1}{L_2}$$

Changes in K will cause changes in the resistance $R_{eff2}$, which in turn will affect the attenuation of the input signal. However, this effect can be minimized by choosing an optimized value for $R_2$. Unlike a shift in resonance frequency, changes in resistance cannot cause a severe degradation on power transfer efficiency. Given the acceptable range for K, by taking placement tolerances into account, one can design the antenna for minimal variations in power transfer.

Figure 7:
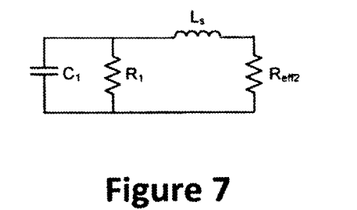
FIG. 7 is an equivalent of the schematic diagram of FIG. 6 when $L_{eff}$ and $C_{eff2}$ resonate.

The series inductor $L_s$ in the transformer equivalent model of FIGS. 5, 6 and 7 is:

$$L_S=(1-K^2)L_1$$

Changes to $L_s$ due to K can be kept small; a careful design of the transformer components will rein in the effect of the L-Match ($L_s$ and $R_{eff2}$) in FIG. 6 to a minimum. The model in FIG. 7 can help elucidate this matter. FIG. 7 is the same as FIG. 6 when $L_{eff}$ and $C_{eff2}$ resonate. The quality factor $Q_M$ for the L-Match in FIG. 7 will be:

$$Q_M = \frac{\omega(1-K^2)L_1}{R_2K^2\left(\frac{L_1}{L_2}\right)} = \frac{\omega(1-K^2)}{K^2}\cdot\frac{L^2}{R^2}$$

Designing the antenna to attain a high value on $R_2$ and designing the inductors to achieve a K factor close to unity will result in a small $Q_M$:

$$R_{eff2} = R_2\left(K^2\frac{L_1}{L_2}\right)(1+Q_M^2)$$

$Q_M^2$ in the equation above will have a minimal effect when $Q_M$ is small. When $Q_M$ is large, $R_{eff2}$ will be:

$$R_{eff2} = R_2\left(K^2\frac{L_1}{L_2}\right)\left(1+\omega^2\left(\frac{(1-K^2)}{K^2}\right)^2\left(\frac{L_2}{R_2}\right)^2\right)$$

$$= \frac{(1-K^2)^2}{K^2}\omega^2\frac{L_1L_2}{R_2}$$

It is noteworthy that in the case of large $Q_M$, and near unity value for K, the effect of the first factor in the right hand side is quite small.

We claim:
1. An RF tag comprising:
   a radio frequency integrated circuit located on a an integrated circuit substrate; and
   an antenna located on an antenna substrate, the RF tag further including a transformer having a first inductor on the circuit substrate and a second inductor on the antenna substrate, wherein the first and second inductors are configured to inductively couple RF signals between the radio frequency integrated circuit and the antenna;
   wherein the first inductor comprises a plurality of first inductors and wherein the second inductor comprises a plurality of second inductors, the RF tag being configured such that any of the first inductors could couple to any of the second inductors.

2. The RF tag of claim 1 wherein at least two of each of the plurality of first inductors and the plurality of second inductors are concentric.

3. The RF tag of claim 1 wherein the inductive coupling acts as ESD protection for the integrated circuit substrate.

4. The RF tag of claim 1 wherein the radio frequency circuit supports multiple radio bands.

\* \* \* \* \*